(12) United States Patent
Masui

(10) Patent No.: US 12,372,760 B2
(45) Date of Patent: Jul. 29, 2025

(54) VARIABLE MAGNIFICATION PROJECTION OPTICAL SYSTEM AND PROJECTION APPARATUS

(71) Applicant: Konica Minolta, Inc., Tokyo (JP)

(72) Inventor: Atsuo Masui, Sakai (JP)

(73) Assignee: KONICA MINOLTA, INC., Tokyo (JP)

( * ) Notice: Subject to any disclaimer, the term of this patent is extended or adjusted under 35 U.S.C. 154(b) by 515 days.

(21) Appl. No.: 17/834,050

(22) Filed: Jun. 7, 2022

(65) Prior Publication Data

US 2022/0397748 A1 Dec. 15, 2022

(30) Foreign Application Priority Data

Jun. 11, 2021 (JP) .................................. 2021-098063

(51) Int. Cl.
*G02B 15/14* (2006.01)
*G02B 15/177* (2006.01)
*G03B 21/14* (2006.01)

(52) U.S. Cl.
CPC ... *G02B 15/143505* (2019.08); *G02B 15/177* (2013.01); *G03B 21/142* (2013.01)

(58) Field of Classification Search
CPC .... G02B 15/143505; G02B 15/144505; G02B 15/144513; G02B 15/145505;

(Continued)

(56) References Cited

U.S. PATENT DOCUMENTS 7,548,378 B2 * 6/2009 Kawakami ........... G02B 15/173
359/683
8,328,369 B2 * 12/2012 Amano ................ G02B 15/177
359/695

(Continued)

FOREIGN PATENT DOCUMENTS

CN       109643008 A    4/2019
JP       H04275515 A   10/1992

(Continued)

OTHER PUBLICATIONS

Schott SF4 Datasheet. Datasheet [online]. Schott, 2014 [retrieved on Dec. 10, 2024]. Retrieved from the Internet: <URL: https://www.schott.com/shop/advanced-optics/en/Optical-Glass/SF4/c/glass-SF4> (Year: 2014).*

(Continued)

*Primary Examiner* — Wyatt A Stoffa
*Assistant Examiner* — Seth D Moser
(74) *Attorney, Agent, or Firm* — CANTOR COLBURN LLP

(57) ABSTRACT

A variable magnification projection optical system includes, in order from an enlargement side: a first lens group having negative refractive power; a second lens group having negative refractive power; and a third lens group having positive refractive power. During zooming, the first lens group is fixed, and the second lens group and the third lens group move. The second lens group includes a plurality of lenses each having positive refractive power. All lenses each having positive refractive power in the first lens group and the second lens group are made of a glass material having a transmittance greater than 0.98 per thickness of 10 mm with respect to light having a wavelength of 440 nm.

16 Claims, 9 Drawing Sheets

(58) Field of Classification Search
CPC .... G02B 15/145513; G02B 15/145521; G02B 15/145529; G02B 15/1465; G02B 15/177; B03B 21/142; B03B 21/147
USPC ....... 359/684, 685, 686, 689, 691, 692, 695; 353/100, 101
See application file for complete search history.

(56) References Cited

U.S. PATENT DOCUMENTS

| | | | |
|---|---|---|---|
| 2011/0304921 A1* | 12/2011 | Nagahara | G02B 15/1465 359/680 |
| 2014/0185144 A1* | 7/2014 | Kubota | G02B 15/20 359/680 |

FOREIGN PATENT DOCUMENTS

| | | |
|---|---|---|
| JP | 2017021121 A | 1/2017 |
| WO | 2014104083 A1 | 7/2014 |

OTHER PUBLICATIONS

Schott SF2 Datasheet. Datasheet [online]. Schott, 2014 [retrieved on Dec. 9, 2024]. Retrieved from the Internet: <URL: https://www.schott.com/shop/advanced-optics/en/Optical-Glass/SF2/c/glass-SF2> (Year: 2014).*
JPO Notice of Reasons for Refusal for corresponding JP Application No. 2021-098063, issued Sep. 17, 2024.
SIPO 1st Office Action for corresponding CN Application No. 202210655455.1; Issued Mar. 26, 2025.

* cited by examiner

Wide

Tele

Wide

Tele

Wide

Tele

Wide

Tele

VARIABLE MAGNIFICATION PROJECTION OPTICAL SYSTEM AND PROJECTION APPARATUS

CROSS REFERENCE TO RELATED APPLICATIONS

The present invention claims priority under 35 U.S.C. § 119 to Japanese Patent Application No. 2021-098063, filed on Jun. 11, 2021, the entire content of which is incorporated herein by reference.

BACKGROUND

Technological Field

The present disclosure relates to a variable magnification projection optical system and a projection apparatus.

Description of the Related Art

International Publication No. 2014/104083 discloses a variable magnification projection optical system including, in order from an enlargement side: a first lens group having negative refractive power; a second lens group having negative refractive power; a third lens group having positive refractive power; a fourth lens group having negative refractive power; a fifth lens group; and a sixth lens group having positive refractive power.

SUMMARY

In the variable magnification projection optical system disclosed in International Publication No. 2014/104083, the number of lenses included in the second lens group is relatively small. In order to reduce distortion aberration in a peripheral region of a projected image at a wide angle end, the number of lenses included in the first lens group needs to be increased. However, since the first lens group is disposed closer to the enlargement side than the second lens group is, the diameters of the lenses included in the first lens group tend to be larger than the diameters of the lenses included in the second lens group. The increased diameters of the lenses lead to an increase in thickness of the lenses (the center thickness of each lens) on the optical axis of the variable magnification projection optical system, and thus, the optical transmittance of the lenses decreases. This makes it difficult to visually recognize a projected image in a bright environment.

The present disclosure has been made in view of the above-described problems, and an object of the present disclosure is to provide a variable magnification projection optical system and a projection apparatus, by which distortion aberration in a peripheral region of a projected image at a wide angle end can be reduced, and the projected image can be readily visually recognized in a bright environment.

To achieve at least one of the above-mentioned objects, according to an aspect of the present disclosure, a variable magnification projection optical system reflecting one aspect of the present disclosure is to enlarge and project an image displayed on an image display surface and comprises, in order from an enlargement side: a first lens group having negative refractive power; a second lens group having negative refractive power; and a third lens group having positive refractive power. During zooming, the first lens group is fixed, and the second lens group and the third lens group move. The second lens group includes a plurality of lenses each having positive refractive power. All lenses each having positive refractive power in the first lens group and the second lens group are made of a glass material having a transmittance greater than 0.98 per thickness of 10 mm with respect to light having a wavelength of 440 nm.

A variable magnification projection optical system according to a second aspect of the present disclosure is to enlarge and project an image displayed on an image display surface and includes, in order from an enlargement side: a first lens group having negative refractive power; a second lens group having negative refractive power; and a third lens group having positive refractive power. During zooming, the first lens group is fixed, and the second lens group and the third lens group move. The second lens group includes a plurality of lenses each having positive refractive power. A refractive index of each of all lenses that has positive refractive power in the first lens group and the second lens group with respect to a d-line is smaller than 1.6.

A projection apparatus according to the present disclosure includes: the variable magnification projection optical system according to the first aspect or the second aspect of the present disclosure; and an image display element having an image display surface.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
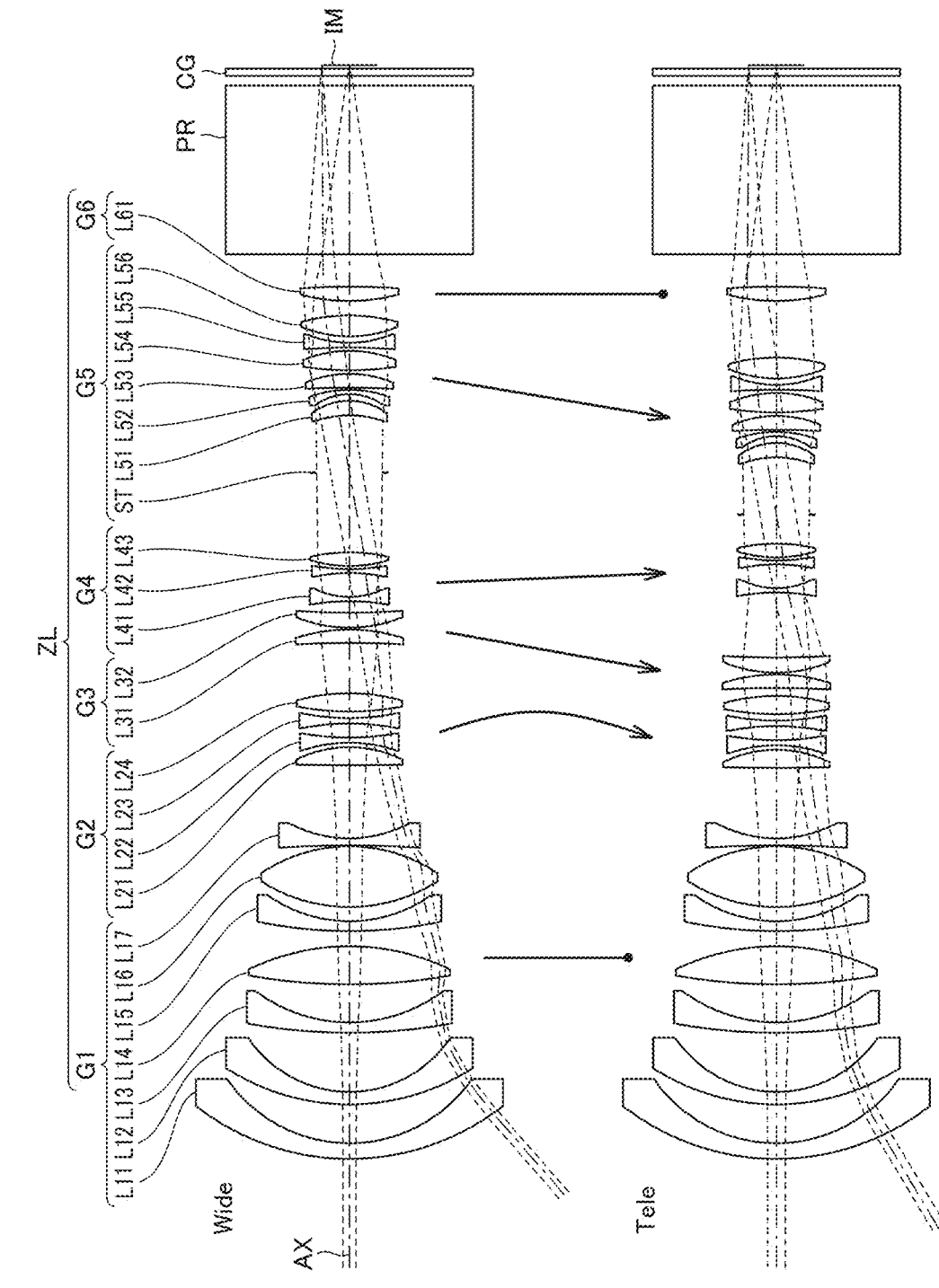
FIG. 1 is a diagram showing a configuration of a variable magnification projection optical system according to a first embodiment.

Hereinafter, one or more embodiments of the present invention will be described with reference to the drawings. However, the scope of the invention is not limited to the disclosed embodiments.

The following describes a variable magnification projection optical system and a projection apparatus according to embodiments of the present disclosure with reference to the accompanying drawings.

A variable magnification projection optical system according to the first aspect of the present embodiment is to enlarge and project an image displayed on an image display surface and includes, in order from an enlargement side: a first lens group having negative refractive power; a second lens group having negative refractive power; and a third lens group having positive refractive power. During zooming, the first lens group is fixed, and the second lens group and the third lens group move. The second lens group includes a plurality of lenses each having positive refractive power. All lenses each having positive refractive power in the first lens group and the second lens group are made of a glass material having a transmittance greater than 0.98 per thickness of 10 mm with respect to light having a wavelength of 440 nm.

The enlargement side means a side on the optical axis of the variable magnification projection optical system that is closer to a screen surface on which an enlarged optical image is projected (or an enlargement-side image surface) (i.e., a front side). The reduction side means a side on the optical axis of the variable magnification projection optical system on which an image display element having an image display surface is disposed (i.e., a rear side).

The variable magnification projection optical system according to the first aspect of the present embodiment includes, in order from the enlargement side: a first lens group having negative refractive power; a second lens group having negative refractive power; and a third lens group having positive refractive power. Thus, off-axis rays converge in the third lens group and then travel through the second lens group and the first lens group. The lenses included in the first lens group and the second lens group can be reduced in diameter. Also, the lenses included in the first lens group and the second lens group can be reduced in center thickness. The transmittance of the lenses included in the first lens group and the second lens group increases, and the optical transmittance of the first lens group and the second lens group increases. Thus, the optical transmittance of the variable magnification projection optical system increases, so that a projected image can be readily visually recognized in a bright environment.

In the variable magnification projection optical system according to the first aspect of the present embodiment, the first lens group is fixed during zooming. Thus, even when the negative refractive power of the first lens group is increased in order to increase the angle of view of the variable magnification projection optical system, variations in aberration during zooming can be reduced.

In the variable magnification projection optical system according to the first aspect of the present embodiment, the second lens group includes a plurality of lenses each having positive refractive power. Thus, even when the negative refractive power of the first lens group is increased in order to increase the angle of view of the variable magnification projection optical system, the distortion aberration resulting from the first lens group can be corrected by the plurality of lenses each having positive refractive power included in the second lens group without increasing the number of lenses each having positive refractive power included in the first lens group. Thus, the distortion aberration in a peripheral region of a projected image at a wide angle end can be reduced. Further, since the number of lenses in the first lens group that tend to be larger in lens diameter can be reduced, the optical transmittance of the first lens group can be increased. The optical transmittance of the variable magnification projection optical system increases, so that the projected image can be readily visually recognized in a bright environment.

In the variable magnification projection optical system according to the first aspect of the present embodiment, all the lenses each having positive refractive power in the first lens group and the second lens group are made of a glass material having a transmittance greater than 0.98 per thickness of 10 mm with respect to light having a wavelength of 440 nm. When a lens having positive refractive power that tends to be larger in center thickness than a lens having negative refractive power is made of a glass material having high transmittance, the optical transmittance of the first lens group and the second lens group increases, so that the optical transmittance of the variable magnification projection optical system increases. Thus, the projected image can be readily visually recognized in a bright environment.

A variable magnification projection optical system according to the second aspect of the present embodiment is to enlarge and project an image displayed on an image display surface and includes, in order from an enlargement side; a first lens group having negative refractive power; a second lens group having negative refractive power; and a third lens group having positive refractive power. During zooming, the first lens group is fixed, and the second lens group and the third lens group move. The second lens group includes a plurality of lenses each having positive refractive power. A refractive index of each of all lenses that has positive refractive power in the first lens group and the second lens group with respect to a d-line (a wavelength of 587.56 nm) is smaller than 1.6.

The variable magnification projection optical system according to the second aspect of the present embodiment includes, in order from the enlargement side; a first lens group having negative refractive power; a second lens group having negative refractive power; and a third lens group having positive refractive power. Thus, off-axis rays converge in the third lens group and then travel through the second lens group and the first lens group. The lenses included in the first lens group and the second lens group can be reduced in diameter. Also, the lenses included in the first lens group and the second lens group can be reduced in center thickness. The transmittance of the lenses included in the first lens group and the second lens group increases, and the optical transmittance of the first lens group and the second lens group increases. Thus, the optical transmittance of the variable magnification projection optical system increases, so that the projected image can be readily visually recognized in a bright environment.

In the variable magnification projection optical system according to the second aspect of the present embodiment, the first lens group is fixed during zooming. Thus, even when the negative refractive power of the first lens group is increased in order to increase the angle of view of the variable magnification projection optical system, variations in aberration during zooming can be reduced.

In the variable magnification projection optical system according to the second aspect of the present embodiment, the second lens group includes a plurality of lenses each having positive refractive power. Thus, even when the negative refractive power of the first lens group is increased in order to increase the angle of view of the variable magnification projection optical system, the distortion aberration resulting from the first lens group can be corrected by the plurality of lenses each having positive refractive power included in the second lens group without increasing the number of lenses each having positive refractive power included in the first lens group. Also, the distortion aberration in the peripheral region of the projected image at the wide angle end can be reduced. Further, since the number of lenses in the first lens group that tend to be larger in lens diameter can be reduced, the optical transmittance of the first lens group can be increased. Thus, the optical transmittance of the variable magnification projection optical system increases, so that the projected image can be readily visually recognized in a bright environment.

The first lens group and the second lens group each have negative refractive power, which results in larger incident angles of the off-axis rays upon the lenses each having positive refractive power in the first lens group and the second lens group. In the variable magnification projection optical system according to the second aspect of the present embodiment, the refractive index of each of all the lenses that has positive refractive power in the first lens group and the second lens group with respect to the d-line is smaller than 1.6. Thus, the incident angles of the off-axis rays upon the lenses each having positive refractive power in the first lens group and the second lens group can be prevented from exceeding the critical angle. Thus, the angle of view of the variable magnification projection optical system can be increased, and the projected image can be readily visually recognized in a bright environment.

In the present embodiment, all lenses in the first lens group are preferably made of a glass material having a transmittance greater than 0.97 per thickness of 10 mm with respect to light having a wavelength of 440 nm.

Accordingly, the optical transmittance of the first lens group increases, and the optical transmittance of the variable magnification projection optical system increases. Thus, the projected image can be readily visually recognized in a bright environment.

In the present embodiment, a refractive index of each of all lenses in the first lens group with respect to the d-line is preferably smaller than 1.75.

In the variable magnification projection optical system according to the second aspect of the present embodiment, the refractive index of each of all the lenses that has positive refractive power in the first lens group and the second lens group with respect to the d-line is smaller than 1.6. Thus, the Petzval sum of the variable magnification projection optical system according to the second aspect of the present embodiment tends to be large. When the refractive index of each of all the lenses in the first lens group with respect to the d-line is set to be smaller than 1.75, the refractive index of each of the lenses that has negative refractive power in the first lens group and the second lens group can be reduced. The Petzval sum of the variable magnification projection optical system decreases, so that worsening of the field curvature of the variable magnification projection optical system can be suppressed.

In the present embodiment, all lenses in the first lens group and the second lens group are preferably made of a glass material having a transmittance greater than 0.97 per thickness of 10 mm with respect to light having a wavelength of 440 nm.

Accordingly, the optical transmittance of the first lens group and the second lens group increases, and the optical transmittance of the variable magnification projection optical system increases. Thus, the projected image can be readily visually recognized in a bright environment.

In the present embodiment, the first lens group preferably includes seven or less lenses each having refractive power.

Since the number of lenses in the first lens group that tend to be larger in lens diameter can be reduced, the optical transmittance of the first lens group can be increased. Thus, the optical transmittance of the variable magnification projection optical system increases, so that the projected image can be readily visually recognized in a bright environment.

In the present embodiment, the second lens group preferably includes four or more lenses each having refractive power.

By increasing the number of lenses in the second lens group that tend to be smaller in diameter than the lenses in the first lens group, the distortion aberration resulting from the first lens group can be corrected more effectively by the plurality of lenses each having positive refractive power included in the second lens group without increasing the number of lenses each having positive refractive power included in the first lens group. Also, the distortion aberration in a peripheral region of a projected image at a wide angle end can be reduced. Further, since the number of lenses in the first lens group that tend to be larger in lens diameter can be reduced, the optical transmittance of the first lens group can be increased. Thus, the optical transmittance of the variable magnification projection optical system increases, so that the projected image can be readily visually recognized in a bright environment.

The variable magnification projection optical system of the present embodiment preferably further includes at least one lens group that is disposed on a reduction side of the third lens group and that moves along an optical axis of the variable magnification projection optical system during zooming.

Accordingly, the lengths in which the second lens group and the third lens group move during zooming can be reduced. Thus, variations in aberration in the variable magnification projection optical system during zooming can be reduced.

In the present embodiment, it is preferable that no asphere is included the first lens group.

Thus, the cost for the first lens group whose lenses tend to be larger in diameter can be reduced while achieving equivalent aberration performance without using an asphere intended for correction of aberration.

It is preferable that no asphere is included in the variable magnification projection optical system of the present embodiment.

Thus, the cost for the variable magnification projection optical system can be reduced while achieving equivalent aberration performance without using an asphere intended for correction of aberration.

The projection apparatus of the present embodiment includes: an image display element having an image display surface; and the variable magnification projection optical system of the present embodiment.

Since the projection apparatus of the present embodiment includes the variable magnification projection optical system of the present embodiment, the distortion aberration in a peripheral region of a projected image at a wide angle end can be reduced, and also, the projected image can be readily visually recognized in a bright environment.

<Specific Optical Configuration of Variable Magnification Projection Optical System According to Embodiments>

A specific optical configuration of a variable magnification projection optical system ZL according to each of the first to fourth embodiments will be hereinafter described with reference to FIGS. 1 to 4. In each of FIGS. 1 to 4, "Wide" is a cross-sectional view of lenses at the wide angle end, "Tele" is a cross-sectional view of lenses at the telephoto end, and "AX" shows an optical axis of variable magnification projection optical system ZL. "Wide" and "Tele" each are a cross-sectional view of lenses seen when a focus is set on an object at infinity.

Variable magnification projection optical system ZL enlarges and projects an image displayed on an image display surface IM of an image display element 7 (see FIG. 9), for example, at an angle of view of 80° or more. On the reduction side of variable magnification projection optical system ZL, a prism PR (for example, a total internal reflection (TIR) prism, a color separation/combination prism, and the like), and a cover glass CG that covers image display surface IM of image display element 7 are disposed.

First Embodiment

Referring to FIG. 1, variable magnification projection optical system ZL substantially includes a plurality of lens groups each having refractive power. For example, variable magnification projection optical system ZL substantially includes six lens groups G1 to G6 each having refractive power. In the present specification, the configuration in which variable magnification projection optical system ZL substantially includes a plurality of lens groups each having refractive power means that variable magnification projection optical system ZL includes a plurality of lens groups each having refractive power, or that variable magnification projection optical system ZL includes a plurality of lens groups each having refractive power and other lens groups each having no refractive power. No asphere is included in variable magnification projection optical system ZL.

Among the plurality of lens groups constituting the variable magnification projection optical system and each having refractive power, first lens group G1 is located closest to the enlargement side. First lens group G1 has negative refractive power. First lens group G1 includes seven or less lenses each having refractive power. Among the plurality of lens groups constituting the variable magnification projection optical system and each having refractive power, second lens group G2 is the second group from the enlargement side. Second lens group G2 has negative refractive power. Second lens group G2 includes four or less lenses each having refractive power. Second lens group G2 includes a plurality of lenses each having positive refractive power. Among the plurality of lens groups constituting the variable magnification projection optical system and each having refractive power, third lens group G3 is the third group from the enlargement side. Third lens group G3 has positive refractive power.

Among the plurality of lens groups constituting the variable magnification projection optical system and each having refractive power, fourth lens group G4 is the fourth group from the enlargement side. Fourth lens group G4 has negative refractive power. Among the plurality of lens groups constituting the variable magnification projection optical system and each having refractive power, fifth lens group G5 is the fifth group from the enlargement side. Fifth lens group G5 has positive refractive power. Fifth lens group G5 has an aperture stop ST on the side closest to the enlargement side in fifth lens group G5. Among the plurality of lens groups constituting the variable magnification projection optical system and each having refractive power, sixth lens group G6 is the sixth group from the enlargement side. Sixth lens group G6 has positive refractive power.

During zooming, the distance between two adjacent lens groups among first lens group G1, second lens group G2, third lens group G3, fourth lens group G4, fifth lens group G5, and sixth lens group G6 changes. For example, during zooming, first and sixth lens groups G1 and G6 are fixed, and second to fifth lens groups G2 to G5 move. Specifically, during zooming from a wide angle end (W) to a telephoto end (T), second lens group G2 moves along a trajectory having a convex shape toward a reduction side (U-turn movement), third lens group G3 moves monotonously toward the enlargement side, fourth lens group G4 moves monotonously toward the reduction side, and fifth lens group G5 moves monotonously toward the enlargement side. Since first and sixth lens groups G1 and G6 are fixed during zooming, the entire length of the variable magnification projection optical system does not change by zooming, and thus, the zooming mechanism of variable magnification projection optical system ZL can be simplified.

Each of first to sixth lens groups G1 to G6 in the first embodiment is configured as follows in order from the object side when each lens is viewed in a paraxial surface shape.

First lens group G1 includes seven lenses L11 to L17 each having refractive power. Specifically, first lens group G1 includes, in order from the enlargement side: a negative meniscus lens L11 having a convex surface facing the enlargement side; a negative meniscus lens L12 having a convex surface facing the enlargement side; a negative meniscus lens L13 having a convex surface facing the enlargement side; a biconvex positive lens L14; a negative meniscus lens L15 having a convex surface facing the enlargement side; a biconvex positive lens L16; and a negative meniscus lens L17 having a convex surface facing the enlargement side. No asphere is included in first lens group G1.

All the lenses each having positive refractive power in first lens group G1 (lenses L14 and L16 in the present embodiment) are made of a glass material having a transmittance greater than 0.98 per thickness of 10 mm with respect to light having a wavelength of 440 nm. Examples of such a glass material may include FC5, FCD1, PCD4, BSC7, BACD5, TAC8, E-FD2, FF5, NBFD11, TAF1, TAF3, or TAFD5G (all of which are manufactured by HOYA).

The refractive index of each of all the lenses (lenses L14 and L16 in the present embodiment) that has positive refractive power in first lens group G1 with respect to the d-line (a wavelength of 587.56 nm) is smaller than 1.6.

When all the lenses each having positive refractive power in first lens group G1 are made, for example, of the above-mentioned glass material manufactured by HOYA, the refractive index of each of all the lenses that has positive refractive power in first lens group G1 with respect to the d-line can be set smaller than 1.6.

All the lenses in first lens group G1 (lenses L11 to L17 in the present embodiment) are made of a glass material having a transmittance greater than 0.97 per thickness of 10 mm with respect to light having a wavelength of 440 nm. Examples of such a glass material may include FC5, FCD1, PCD4, BSC7, BACD5, TAC8, E-FD2, FF5, NBFD11, TAF1, TAF3, TAFD5G, E-FDS, E-FD1, BAFD8, or NBFD13 (all of which are manufactured by HOYA). All the lenses each having positive refractive power in first lens group G1 (lenses L14 and L16 in the present embodiment) are made of a glass material having a transmittance greater than 0.98 per thickness of 10 mm with respect to light having a wavelength of 440 nm. Accordingly, among all the lenses in first lens group G1, all the lenses each having positive refractive power in first lens group G1 naturally satisfy the condition that these lenses are made of a glass material having a transmittance greater than 0.97 per thickness of 10 mm with respect to light having a wavelength of 440 nm.

The refractive index of each of all the lenses (lenses L11 to L17 in the present embodiment) in first lens group G1 with respect to the d-line is smaller than 1.75. When all the lenses in first lens group G1 are made, for example, of the above-mentioned glass material manufactured by HOYA, the refractive index of each of all the lenses that has positive refractive power in first lens group G1 with respect to the d-line can be set smaller than 1.75. The refractive index of each of all the lenses (lenses L14 and L16 in the present embodiment) that has positive refractive power in first lens group G1 with respect to the d-line is smaller than 1.6. Accordingly, among all the lenses in first lens group G1, all the lenses each having positive refractive power in first lens group G1 naturally satisfy the condition that the refractive index of each lens with respect to the d-line is smaller than 1.75.

Second lens group G2 includes four lenses L21 to L24 each having refractive power. Second lens group G2 includes two lenses each having positive refractive power. Specifically, second lens group G2 includes, in order from the enlargement side: a biconvex positive lens L21; a biconcave negative lens L22; a biconcave negative lens L23; and a biconvex positive lens L24. No asphere is included in second lens group G2.

All the lenses each having positive refractive power in second lens group G2 (lenses L21 and L24 in the present embodiment) are made of a glass material having a transmittance greater than 0.98 per thickness of 10 mm with respect to light having a wavelength of 440 nm. Examples of such a glass material may include FC5, FCD1, PCD4, BSC7, BACD5, TAC8, E-FD2, FF5, NBFD11, TAF1, TAF3, or TAFD5G (all of which are manufactured by HOYA).

The refractive index of each of all the lenses (lenses L21 and L24 in the present embodiment) that has positive refractive power in second lens group G2 with respect to the d-line is smaller than 1.6. When all the lenses each having positive refractive power in second lens group G2 are made, for example, of the above-mentioned glass material manufactured by HOYA, the refractive index of each of all the lenses that has positive refractive power in second lens group G2 with respect to the d-line can be set smaller than 1.6.

All the lenses in second lens group G2 (lenses L21 to L24 in the present embodiment) are made of a glass material having a transmittance greater than 0.97 per thickness of 10 mm with respect to light having a wavelength of 440 nm. Examples of such a glass material may include FC5, FCD1, PCD4, BSC7, BACD5, TAC8, E-FD2, FF5, NBFD11, TAF1, TAF3, TAFD5G, E-FDS, E-FD1, BAFD8, or NBFD13 (all of which are manufactured by HOYA). All the lenses each having positive refractive power in second lens group G2 (lenses L21 and L24 in the present embodiment) are made of a glass material having a transmittance greater than 0.98 per thickness of 10 mm with respect to light having a wavelength of 440 nm. Accordingly, among all the lenses in second lens group G2, all the lenses each having positive refractive power in second lens group G2 naturally satisfy the condition that these lenses are made of a glass material having a transmittance greater than 0.97 per thickness of 10 mm with respect to light having a wavelength of 440 nm.

The refractive index of each of all the lenses (lenses 21 to L24 in the present embodiment) in second lens group G2 with respect to the d-line is smaller than 1.75. When all the lenses in second lens group G2 are made, for example, of the above-mentioned glass material manufactured by HOYA, the refractive index of each of all the lenses that has positive refractive power in second lens group G2 with respect to the d-line can be set smaller than 1.75. The refractive index of each of all the lenses (lenses L21 and L24 in the present embodiment) that has positive refractive power in second lens group G2 with respect to the d-line is smaller than 1.6. Accordingly, among all the lenses in second lens group G2, all the lenses each having positive refractive power in second lens group G2 naturally satisfy the condition that the refractive index of each lens with respect to the d-line is smaller than 1.75.

Third lens group G3 includes two lenses L31 and L32 each having refractive power. Specifically, third lens group G3 includes, in order from the enlargement side: a positive meniscus lens L31 having a convex surface facing the reduction side; and a positive meniscus lens L32 having a convex surface facing the enlargement side. No asphere is included in third lens group G3.

Fourth lens group G4 includes three lenses L41 to L43 each having refractive power. Specifically, fourth lens group G4 includes, in order from the enlargement side: a biconcave negative lens L41; a biconcave negative lens L42; and a biconvex positive lens L43. No asphere is included in fourth lens group G4.

Fifth lens group G5 includes six lenses L51 to L56 each having refractive power. Specifically, fifth lens group G5 includes, in order from the enlargement side: a positive meniscus lens L51 having a convex surface facing the reduction side; a negative meniscus lens L52 having a convex surface facing the reduction side; a positive meniscus lens L53 having a convex surface facing the reduction side; a biconvex positive lens L54; a biconcave negative lens L55; and a biconvex positive lens L56. No asphere is included in fifth lens group G5.

Sixth lens group G6 includes one lens L61 having refractive power. Specifically, sixth lens group G6 includes a biconvex positive lens L61. No asphere is included in sixth lens group G6.

Second Embodiment

Figure 2:
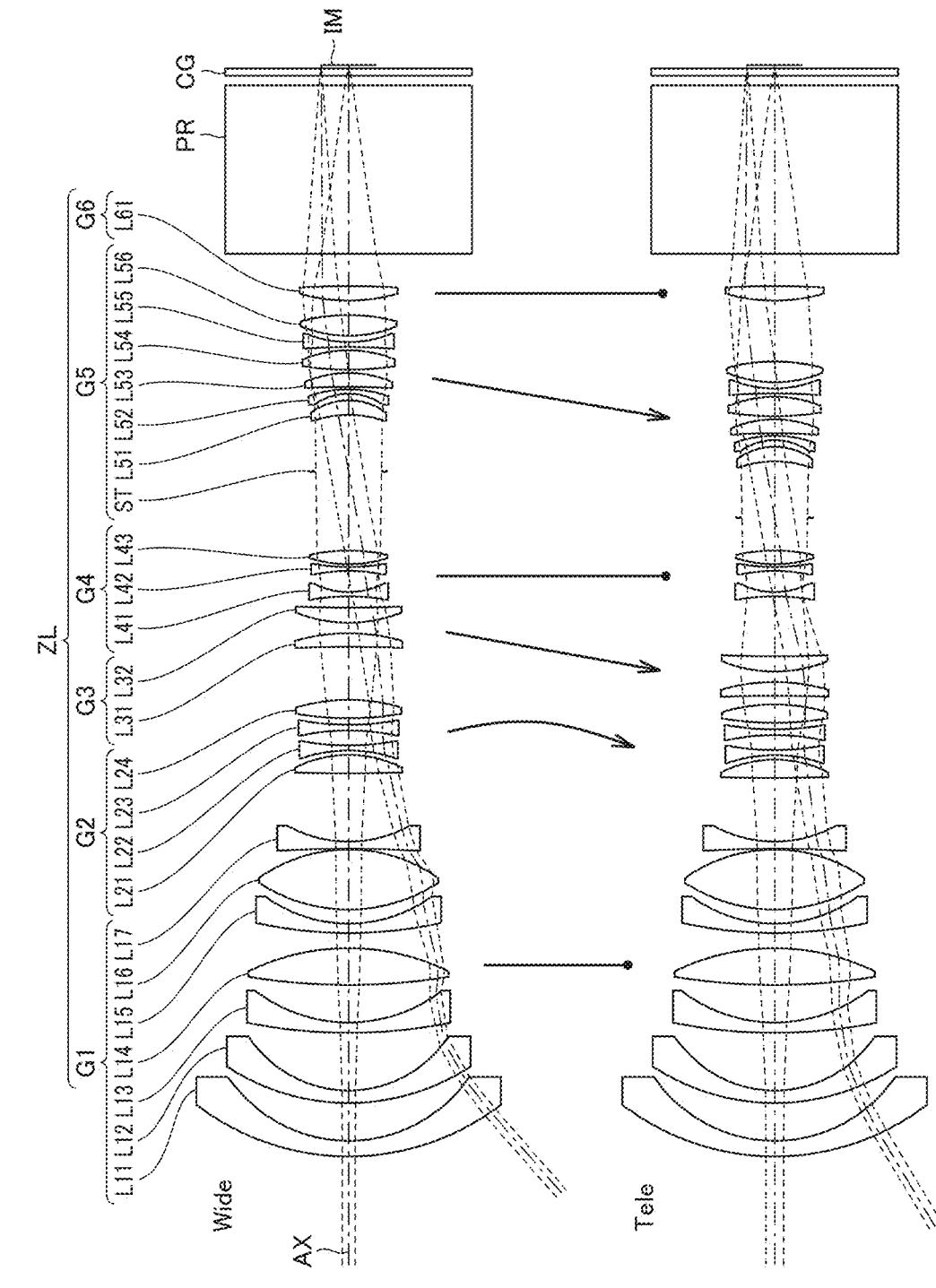
FIG. 2 is a diagram showing a configuration of a variable magnification projection optical system according to a second embodiment.

Referring to FIG. 2, variable magnification projection optical system ZL of the second embodiment is configured similarly to variable magnification projection optical system ZL of the first embodiment (see FIG. 1) but is different from variable magnification projection optical system ZL of the first embodiment in the following points. Specifically, in the second embodiment, fourth lens group G4 is fixed during zooming. Variable magnification projection optical system ZL of the second embodiment has a wider angle of view than that of variable magnification projection optical system ZL of the first embodiment.

Third Embodiment

Figure 3:
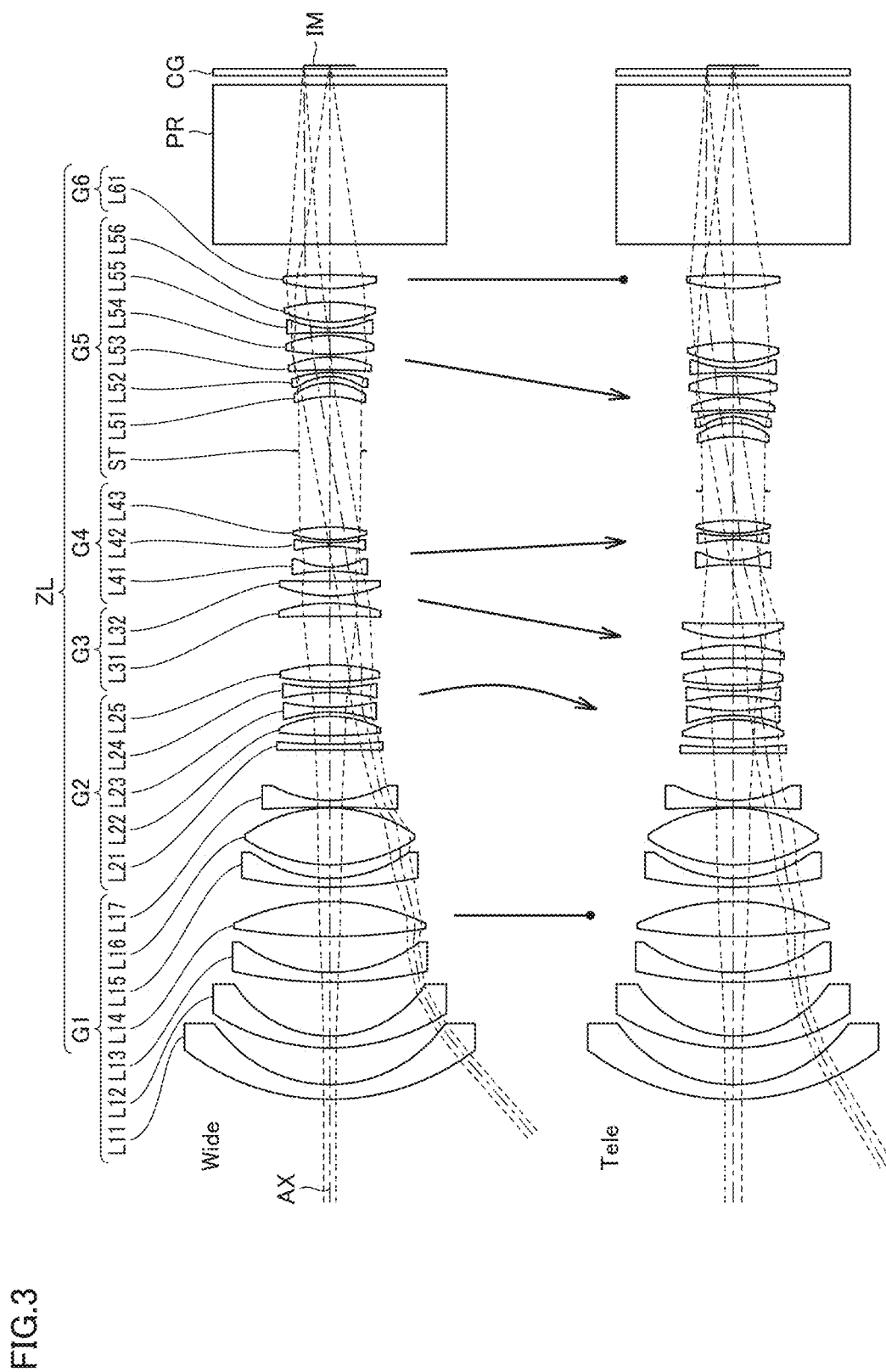
FIG. 3 is a diagram showing a configuration of a variable magnification projection optical system according to a third embodiment.

Referring to FIG. 3, variable magnification projection optical system ZL of the third embodiment is configured similarly to variable magnification projection optical system ZL of the first embodiment (see FIG. 1) but is different from variable magnification projection optical system ZL of the first embodiment in the following points. In variable magnification projection optical system ZL of the third embodiment, a negative lens L21 having a flat surface on the enlargement side and a concave surface on the reduction side is added on the side closest to the enlargement side in second lens group G2. Thus, second lens group G2 includes five lenses L21 to L25.

Specifically, second lens group G2 in the third embodiment is configured as follows in order from the object side when each lens is viewed in a paraxial surface shape. Second lens group G2 includes five lenses L21 to L25 each having refractive power. Second lens group G2 includes two lenses each having positive refractive power. Specifically, second lens group G2 includes, in order from the enlargement side: a negative lens L21 having a flat surface on the enlargement side and a concave surface on the reduction side; a biconvex positive lens L22; a biconcave negative lens L23; a biconcave negative lens L24; and a biconvex positive lens L25. No asphere is included in second lens group G2.

All the lenses each having positive refractive power in second lens group G2 (lenses L22 and L25 in the present embodiment) are made of a glass material having a transmittance greater than 0.98 per thickness of 10 mm with respect to light having a wavelength of 440 nm. Examples of such a glass material may include FC5, FCD1, PCD4, BSC7, BACD5, TAC8, E-FD2, FF5, NBFD11, TAF1, TAF3, or TAFD5G (all of which are manufactured by HOYA).

The refractive index of each of all the lenses (lenses L22 and L25 in the present embodiment) that has positive refractive power in second lens group G2 with respect to the d-line is smaller than 1.6. When all the lenses each having positive refractive power in second lens group G2 are made, for example, of the above-mentioned glass material manufactured by HOYA, the refractive index of each of all the lenses that has positive refractive power in second lens group G2 with respect to the d-line can be set smaller than 1.6.

All the lenses in second lens group G2 (lenses L21 to L25 in the present embodiment) are made of a glass material having a transmittance greater than 0.97 per thickness of 10 mm with respect to light having a wavelength of 440 nm. Examples of such a glass material may include FC5, FCD1, PCD4, BSC7, BACD5, TAC8, E-FD2, FF5, NBFD11, TAF1, TAF3, TAFD5G, E-FDS, E-FD1, BAFD8, or NBFD13 (all of which are manufactured by HOYA). All the lenses each having positive refractive power in second lens group G2 (lenses L22 and L25 in the present embodiment) are made of a glass material having a transmittance greater than 0.98 per thickness of 10 mm with respect to light having a wavelength of 440 nm. Accordingly, among all the lenses in second lens group G2, all the lenses each having positive refractive power in second lens group G2 naturally satisfy the condition that these lenses are made of a glass material having a transmittance greater than 0.97 per thickness of 10 mm with respect to light having a wavelength of 440 nm.

The refractive index of each of all the lenses (lenses 21 to L25 in the present embodiment) in second lens group G2 with respect to the d-line is smaller than 1.75. When all the lenses in second lens group G2 are made, for example, of the above-mentioned glass material manufactured by HOYA, the refractive index of each of all the lenses that has positive refractive power in second lens group G2 with respect to the d-line can be set smaller than 1.75. The refractive index of each of all the lenses (lenses L22 and L25 in the present embodiment) that has positive refractive power in second lens group G2 with respect to the d-line is smaller than 1.6. Accordingly, among all the lenses in second lens group G2, all the lenses each having positive refractive power in second lens group G2 naturally satisfy the condition that the refractive index of each lens with respect to the d-line is smaller than 1.75.

Fourth Embodiment

Figure 4:
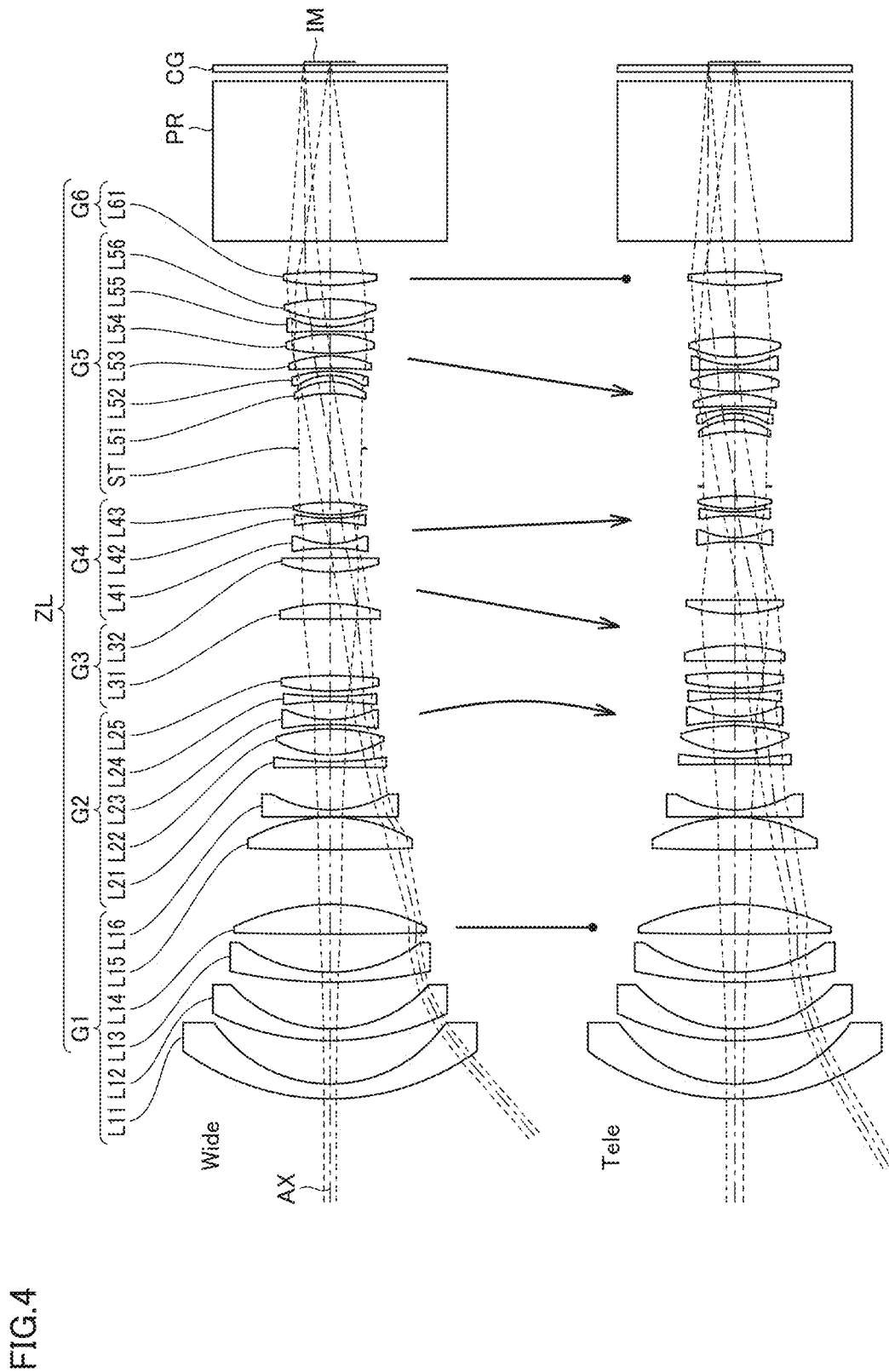
FIG. 4 is a diagram showing a configuration of a variable magnification projection optical system according to a fourth embodiment.
Figure 5A:
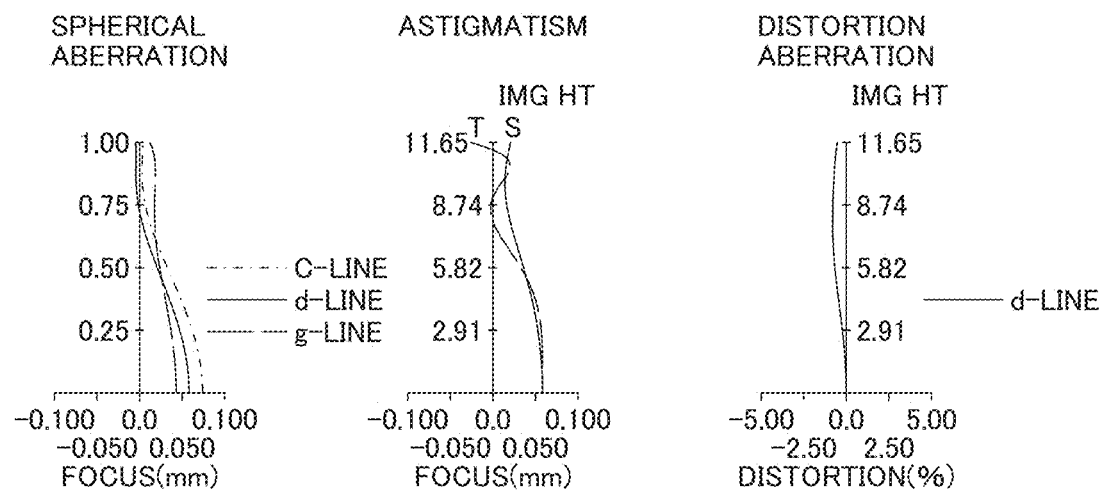
FIG. 5A is a longitudinal aberration diagram at a wide angle end in Example 1 and shows aberrations (a spherical aberration, an astigmatism, and a distortion aberration) at the wide angle end.
Figure 5B:
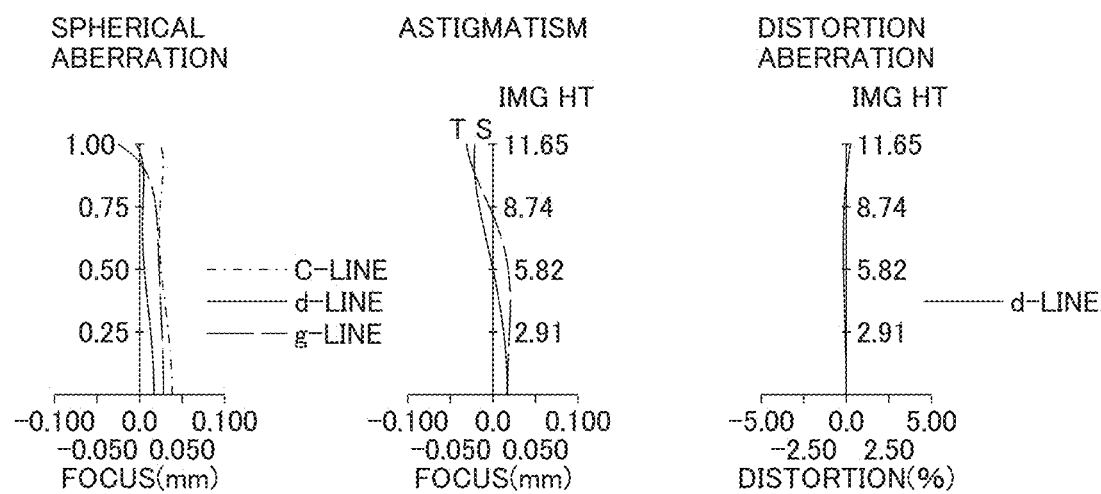
FIG. 5B is a longitudinal aberration diagram at a telephoto end in Example 1 and shows aberrations (a spherical aberration, an astigmatism, and a distortion aberration) at the telephoto end.
Figure 6A:
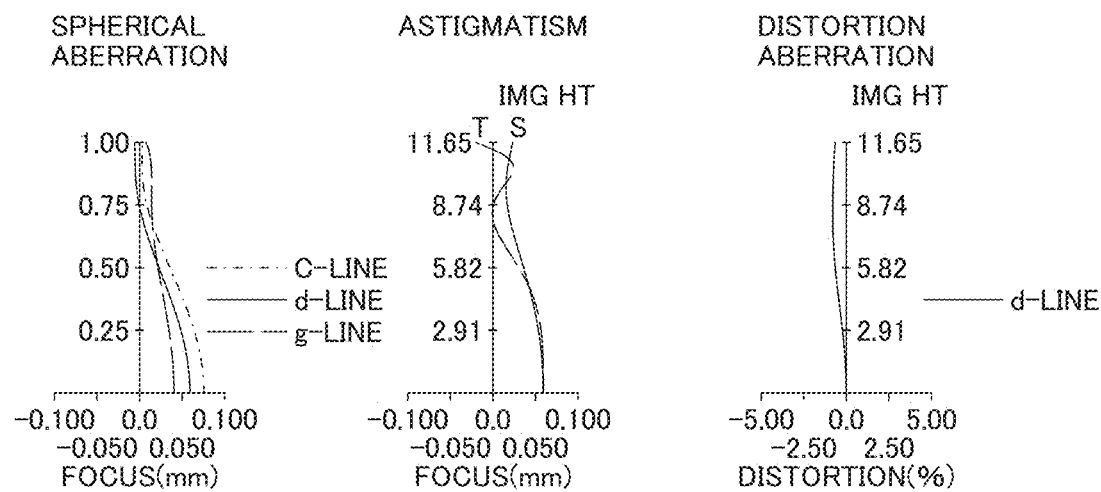
FIG. 6A is a longitudinal aberration diagram at a wide angle end in Example 2 and shows aberrations (a spherical aberration, an astigmatism, and a distortion aberration) at the wide angle end.
Figure 6B:
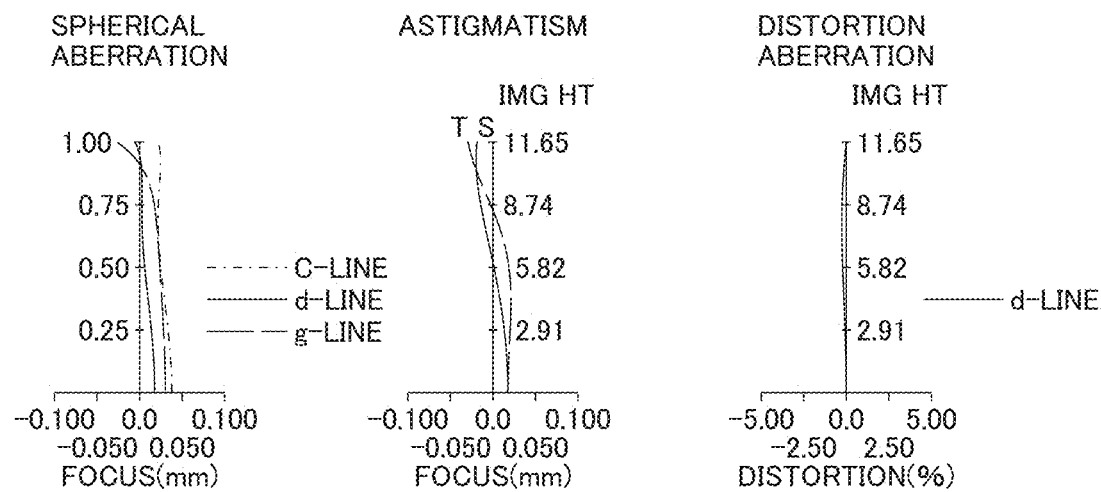
FIG. 6B is a longitudinal aberration diagram at a telephoto end in Example 2 and shows aberrations (a spherical aberration, an astigmatism, and a distortion aberration) at the telephoto end.
Figure 7A:
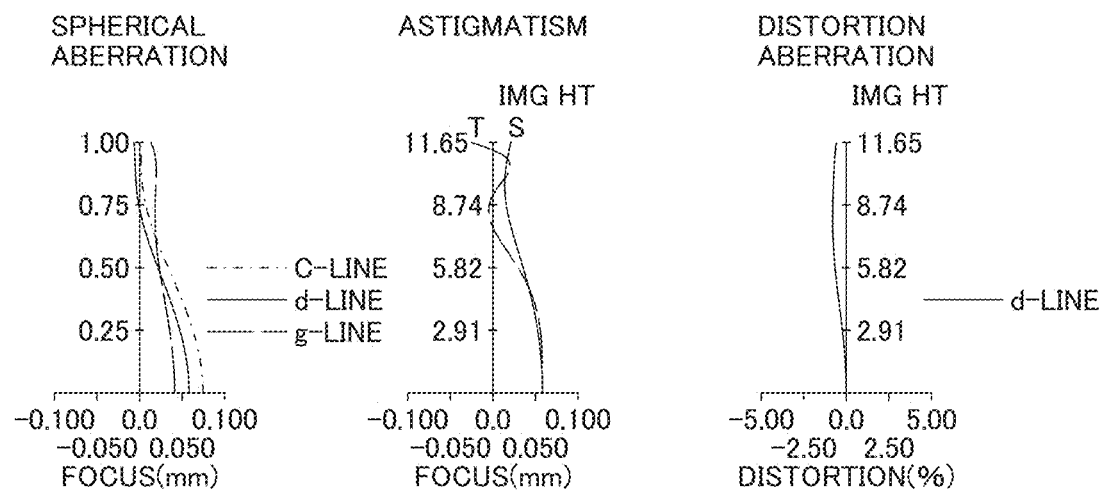
FIG. 7A is a longitudinal aberration diagram at a wide angle end in Example 3 and shows aberrations (a spherical aberration, an astigmatism, and a distortion aberration) at the wide angle end.
Figure 7B:
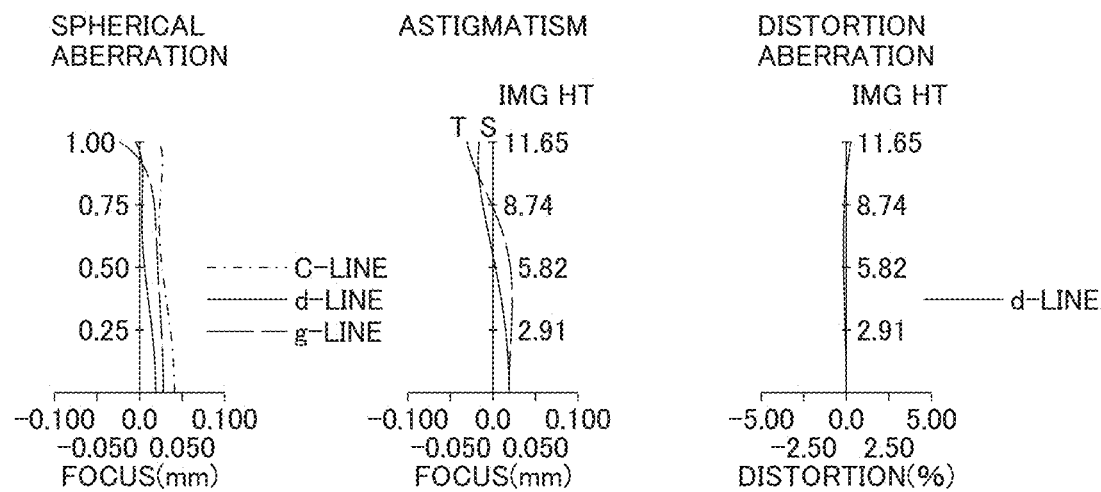
FIG. 7B is a longitudinal aberration diagram at a telephoto end in Example 3 and shows aberrations (a spherical aberration, an astigmatism, and a distortion aberration) at the telephoto end.
Figure 8A:
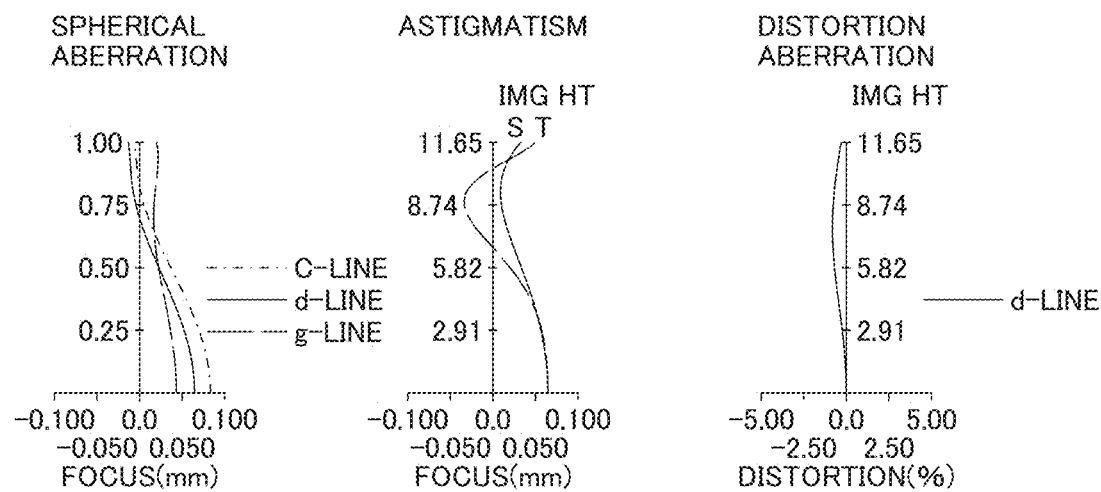
FIG. 8A is a longitudinal aberration diagram at a wide angle end in Example 4 and shows aberrations (a spherical aberration, an astigmatism, and a distortion aberration) at the wide angle end.
Figure 8B:
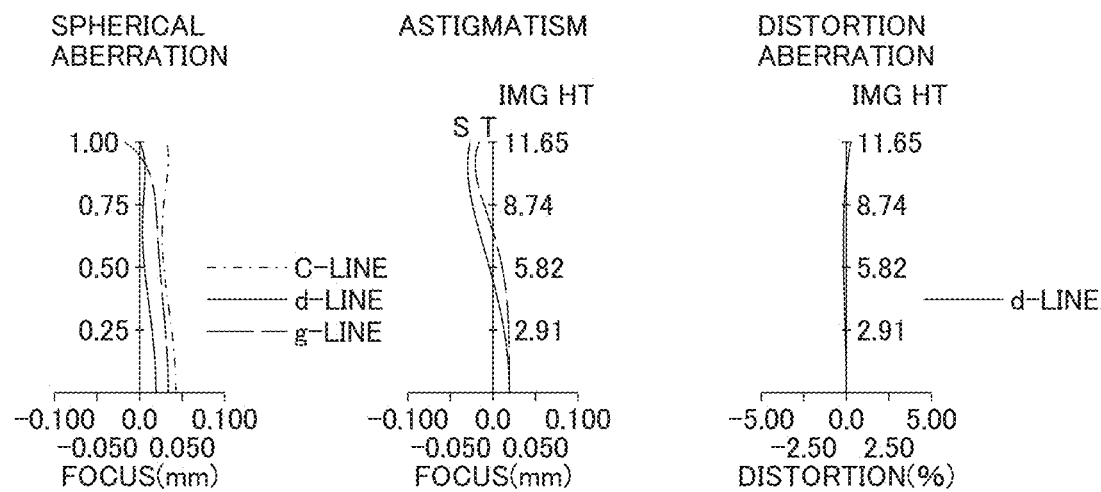
FIG. 8B is a longitudinal aberration diagram at a telephoto end in Example 4 and shows aberrations (a spherical aberration, an astigmatism, and a distortion aberration) at the telephoto end.

Referring to FIG. 4, variable magnification projection optical system ZL of the fourth embodiment is configured similarly to variable magnification projection optical system ZL of the third embodiment (see FIG. 3) but is different from variable magnification projection optical system ZL of the third embodiment in the following points. Specifically, first lens group G1 includes six lenses L11 to L16. Lens L21 disposed on the side closest to the enlargement side in second lens group G2 is a biconcave negative lens L21.

Specifically, first lens group G1 and second lens group G2 according to the fourth embodiment are configured as follows in order from the object side when each lens is viewed in a paraxial surface shape.

First lens group G1 includes six lenses L11 to L16 each having refractive power. Specifically, first lens group G1 includes, in order from the enlargement side: a negative meniscus lens L11 having a convex surface facing the enlargement side; a negative meniscus lens L12 having a convex surface facing the enlargement side; a negative meniscus lens L13 having a convex surface facing the enlargement side; a biconvex positive lens L14; a biconvex positive lens L15; and a biconcave negative lens L16. No asphere is included in first lens group G1.

All the lenses each having positive refractive power in first lens group G1 (lenses L14 and L15 in the present embodiment) are made of a glass material having a transmittance greater than 0.98 per thickness of 10 mm with respect to light having a wavelength of 440 nm. Examples of such a glass material may include FC5, FCD1, PCD4, BSC7, BACD5, TAC8, E-FD2, FF5, NBFD11, TAF1, TAF3, or TAFD5G (all of which are manufactured by HOYA).

The refractive index of each of all the lenses (lenses L14 and L15 in the present embodiment) that has positive refractive power in first lens group G1 with respect to the d-line is smaller than 1.6. When all the lenses each having positive refractive power in first lens group G1 are made, for example, of the above-mentioned glass material manufactured by HOYA, the refractive index of each of all the lenses that has positive refractive power in first lens group G1 with respect to the d-line can be set smaller than 1.6.

All the lenses in first lens group G1 (lenses L11 to L16 in the present embodiment) are made of a glass material having a transmittance greater than 0.97 per thickness of 10 mm with respect to light having a wavelength of 440 nm. Examples of such a glass material may include FC5, FCD1, PCD4, BSC7, BACD5, TAC8, E-FD2, FF5, NBFD11, TAF1, TAF3, TAFD5G, E-FDS, E-FD1, BAFD8, or NBFD13 (all of which are manufactured by HOYA). All the lenses each having positive refractive power in first lens group G1 (lenses L14 and L15 in the present embodiment) are made of a glass material having a transmittance greater than 0.98 per thickness of 10 mm with respect to light having a wavelength of 440 nm. Accordingly, among all the lenses in first lens group G1, all the lenses each having positive refractive power in first lens group G1 naturally satisfy the condition that these lenses are made of a glass material having a transmittance greater than 0.97 per thickness of 10 mm with respect to light having a wavelength of 440 nm.

The refractive index of each of all the lenses (lenses L11 to L16 in the present embodiment) in first lens group G1 with respect to the d-line is smaller than 1.75. When all the lenses in first lens group G1 are made, for example, of the above-mentioned glass material manufactured by HOYA, the refractive index of each of all the lenses that has positive refractive power in first lens group G1 with respect to the d-line can be set smaller than 1.75. The refractive index of each of all the lenses (lenses L14 and L15 in the present embodiment) that has positive refractive power in first lens group G1 with respect to the d-line is smaller than 1.6. Accordingly, among all the lenses in first lens group G1, all the lenses each having positive refractive power in first lens group G1 naturally satisfy the condition that the refractive index of each lens with respect to the d-line is smaller than 1.75.

Second lens group G2 includes five lenses L21 to L25 each having refractive power. Second lens group G2 includes two lenses each having positive refractive power. Specifically, second lens group G2 includes, in order from the enlargement side, a biconcave negative lens L21, a biconvex positive lens L22, a biconcave negative lens L23, a biconcave negative lens L24, and a biconvex positive lens L25. No asphere is included in second lens group G2.

All the lenses each having positive refractive power in second lens group G2 (lenses L22 and L25 in the present embodiment) are made of a glass material having a transmittance greater than 0.98 per thickness of 10 mm with respect to light having a wavelength of 440 nm. Examples of such a glass material may include FC5, FCD1, PCD4, BSC7, BACD5, TAC8, E-FD2, FF5, NBFD11, TAF1, TAF3, or TAFD5G (all of which are manufactured by HOYA).

The refractive index of each of all the lenses (lenses L22 and L25 in the present embodiment) that has positive refractive power in second lens group G2 with respect to the d-line is smaller than 1.6. When all the lenses each having positive refractive power in second lens group G2 are made, for example, of the above-mentioned glass material manufactured by HOYA, the refractive index of each of all the lenses that has positive refractive power in second lens group G2 with respect to the d-line can be set smaller than 1.6.

All the lenses in second lens group G2 (lenses L21 to L25 in the present embodiment) are made of a glass material having a transmittance greater than 0.97 per thickness of 10 mm with respect to light having a wavelength of 440 nm. Examples of such a glass material may include FC5, FCD1, PCD4, BSC7, BACD5, TAC8, E-FD2, FF5, NBFD11, TAF1, TAF3, TAFD5G, E-FDS, E-FD1, BAFD8, or NBFD13 (all of which are manufactured by HOYA). All the lenses each having positive refractive power in second lens group G2 (lenses L22 and L25 in the present embodiment) are made of a glass material having a transmittance greater than 0.98 per thickness of 10 mm with respect to light having a wavelength of 440 nm. Accordingly, among all the lenses in second lens group G2, all the lenses each having positive refractive power in second lens group G2 naturally satisfy the condition that these lenses are made of a glass material having a transmittance greater than 0.97 per thickness of 10 mm with respect to light having a wavelength of 440 nm.

The refractive index of each of all the lenses (lenses 21 to L25 in the present embodiment) in second lens group G2 with respect to the d-line is smaller than 1.75. When all the lenses in second lens group G2 are made, for example, of the above-mentioned glass material manufactured by HOYA, the refractive index of each of all the lenses that has positive refractive power in second lens group G2 with respect to the d-line can be set smaller than 1.75. The refractive index of each of all the lenses (lenses L22 and L25 in the present embodiment) that has positive refractive power in second lens group G2 with respect to the d-line is smaller than 1.6. Accordingly, among all the lenses in second lens group G2, all the lenses each having positive refractive power in second lens group G2 naturally satisfy the condition that the refractive index of each lens with respect to the d-line is smaller than 1.75.

EXAMPLES

The following more specifically describes the configuration and the like of variable magnification projection optical system ZL according to each of the first to fourth embodiments with reference to construction data and the like in each of Examples. Examples 1 to 4 described below are numerical examples corresponding to respective ones of the above-mentioned first to fourth embodiments. The configuration diagrams of variable magnification projection optical systems ZL representing the respective first to fourth embodiments (FIGS. 1 to 4) show the optical configurations (lens arrangements, lens shapes, and the like) in respective Examples 1 to 4.

The construction data in each of Examples show surface data in order, from the left column, of a surface number "i", a radius of curvature "r" (mm) in a paraxial position, an on-axis surface interval "d" (mm), a refractive index "nd" with respect to a d-line (a wavelength of 587.56 nm), and an Abbe number "vd" with respect to the d-line. Note that "SC" represents a screen surface, "stop" represents an aperture stop, and "image" represents an image display surface.

Various types of data in Examples 1 to 4 include: a zoom ratio; and, in each of the focal length states at a wide angle end (Wide), a middle focal length state (Middle) and a telephoto end (Tele), a focal length (Fl, mm) of the entire system in variable magnification projection optical systems ZL, F-number (Fno.), a half angle of view (ω, °), an image height (y'max, mm), a total lens length (TL, mm), a back focus (BF, mm), and a variable on-axis surface interval (variable: di (i: surface number), mm). Further, the focal length (mm) of each lens group is shown as lens group data. Note that back focus BF is represented by the distance from the last lens surface to the paraxial image surface in terms of an air conversion length. Total lens length TL is obtained by adding back focus BF to the distance from the foremost lens surface (the surface of first lens group G1 closest to the enlargement side) to the last lens surface (the surface of six lens group G6 closest to the reduction side). Image height y'max corresponds to a half of the diagonal length of image display surface IM.

In the spherical aberration diagram shown in each of FIGS. 5A to 8C, an amount of spherical aberration with respect to a d-line (a wavelength of 587.56 nm) (indicated by a solid line), an amount of spherical aberration with respect to a C-line (a wavelength of 656.28 nm) (indicated by a one-dot dashed-line), and an amount of spherical aberration with respect to a g-line (a wavelength of 435.84 nm) (indicated by a broken line) are represented by the respective amounts of shift (unit: mm) of the focal position in the direction of optical axis AX from the paraxial image surface. The vertical axis represents values obtained by normalizing incident heights on the pupil by the maximum height (i.e., represents relative pupil heights). In the astigmatism diagram shown in each of FIGS. 5A to 8C, a broken line T represents a tangential image surface with respect to the d-line in terms of the amount of shift (unit: mm) of the focal position in the direction of optical axis AX from the paraxial image surface. A solid line S represents a sagittal image surface with respect to the d-line in terms of the amount of shift (unit: mm) of the focal position in the direction of optical axis AX from the paraxial image surface. The vertical axis represents an image height (IMG HT, unit: mm). In the distortion aberration diagram in each of FIGS. 5A to 8C, the horizontal axis represents distortion (unit: %) with respect to the d-line, and the vertical axis represents the image height (IMG HT, unit: mm).

Numerical Example 1

| Unit: mm | | | | |
|---|---|---|---|---|
| Surface Data | | | | |
| i | r | d | nd | vd |
| object (SC) | infinity | 3800.000 | | |
| 1 | 106.581 | 6.500 | 1.62299 | 58.12 |
| 2 | 63.433 | 16.118 | | |
| 3 | 97.699 | 5.200 | 1.72916 | 54.67 |
| 4 | 51.928 | 24.530 | | |
| 5 | 242.462 | 4.300 | 1.59282 | 68.62 |
| 6 | 66.885 | 15.796 | | |
| 7 | 248.848 | 15.788 | 1.58144 | 40.89 |
| 8 | −99.187 | 6.300 | | |
| 9 | 191.181 | 4.123 | 1.67270 | 32.17 |
| 10 | 60.687 | 5.886 | | |
| 11 | 70.334 | 25.210 | 1.51680 | 64.20 |
| 12 | −67.549 | 0.300 | | |
| 13 | −524.049 | 3.000 | 1.72916 | 54.67 |
| 14 | 54.291 | variable | | |
| 15 | 989.335 | 7.519 | 1.51680 | 64.20 |
| 16 | −51.381 | 1.857 | | |
| 17 | −62.834 | 2.100 | 1.80610 | 33.27 |
| 18 | 110.132 | 5.877 | | |
| 19 | −103.401 | 2.246 | 1.59282 | 68.62 |
| 20 | 101.746 | 2.708 | | |
| 21 | 117.780 | 7.555 | 1.58144 | 40.89 |
| 22 | −84.602 | variable | | |
| 23 | −390.397 | 5.542 | 1.54072 | 47.20 |
| 24 | −74.782 | 0.769 | | |
| 25 | 59.464 | 6.259 | 1.74330 | 49.22 |
| 26 | 343.396 | variable | | |
| 27 | −91.179 | 1.800 | 1.43700 | 95.10 |
| 28 | 34.024 | 9.878 | | |
| 29 | −71.362 | 1.604 | 1.43700 | 95.10 |
| 30 | 83.948 | 1.294 | | |
| 31 | 56.653 | 5.688 | 1.56732 | 42.84 |
| 32 | −72.825 | variable | | |
| 33 (stop) | infinity | 23.800 | | |
| 34 | −43.788 | 6.025 | 1.43700 | 95.10 |
| 35 | −26.929 | 2.765 | | |
| 36 | −24.924 | 1.800 | 1.80420 | 46.50 |
| 37 | −49.585 | 0.858 | | |
| 38 | −351.166 | 5.757 | 1.43700 | 95.10 |
| 39 | −48.772 | 1.462 | | |
| 40 | 129.382 | 8.077 | 1.43700 | 95.10 |
| 41 | −52.148 | 1.374 | | |
| 42 | −259.563 | 2.000 | 1.80610 | 40.73 |
| 43 | 47.611 | 2.645 | | |
| 44 | 54.167 | 8.694 | 1.43700 | 95.10 |
| 45 | −76.885 | variable | | |
| 46 | 81.437 | 5.892 | 1.61997 | 63.88 |
| 47 | −333.642 | 13.500 | | |
| 48 | infinity | 70.000 | 1.51680 | 64.20 |
| 49 | infinity | 4.000 | | |
| 50 | infinity | 3.000 | 1.48749 | 70.44 |
| 51 | infinity | 1.500 | | |
| image | infinity | | | |

| Various Types of Data | | | |
|---|---|---|---|
| Zoom Ratio | | 1.46 | |
| | Wide | Middle | Tele |
| Fl | 13.115 | 16.121 | 19.127 |
| Fno. | 2.354 | 2.425 | 2.490 |
| ω | 41.693 | 35.807 | 31.248 |
| y'max | 11.650 | 11.650 | 11.650 |
| TL | 429.225 | 429.203 | 429.184 |
| BF | 67.225 | 67.203 | 67.184 |
| d14 | 30.335 | 32.948 | 29.249 |

-continued

Unit: mm

| | | | |
|---|---|---|---|
| d22 | 20.934 | 9.092 | 3.356 |
| d26 | 4.751 | 16.737 | 27.004 |
| d32 | 33.084 | 21.150 | 12.014 |
| d45 | 6.000 | 15.177 | 23.480 |

Lens Group Data

| Group (Surface) | Focal Length |
|---|---|
| 1 (1-14) | −54.978 |
| 2 (15-22) | −131.885 |
| 3 (23-26) | 61.107 |
| 4 (27-32) | −118.103 |
| 5 (33-45) | 169.316 |
| 6 (46-51) | 106.162 |

Numerical Example 2

Unit: mm

Surface Data

| i | r | d | nd | vd |
|---|---|---|---|---|
| object (SC) | infinity | 3800.000 | | |
| 1 | 107.210 | 6.500 | 1.62299 | 58.12 |
| 2 | 62.359 | 15.750 | | |
| 3 | 95.185 | 5.200 | 1.72916 | 54.67 |
| 4 | 51.122 | 23.976 | | |
| 5 | 222.503 | 4.300 | 1.59282 | 68.62 |
| 6 | 65.774 | 15.616 | | |
| 7 | 266.825 | 15.299 | 1.58144 | 40.89 |
| 8 | −97.746 | 6.300 | | |
| 9 | 184.501 | 3.900 | 1.67270 | 32.17 |
| 10 | 60.532 | 5.877 | | |
| 11 | 70.322 | 24.966 | 1.51680 | 64.20 |
| 12 | −66.665 | 0.300 | | |
| 13 | −530.147 | 3.000 | 1.72916 | 54.67 |
| 14 | 54.117 | variable | | |
| 15 | 973.821 | 7.621 | 1.51680 | 64.20 |
| 16 | −51.054 | 1.848 | | |
| 17 | −62.473 | 2.100 | 1.80610 | 33.27 |
| 18 | 108.891 | 6.261 | | |
| 19 | −95.303 | 2.361 | 1.59282 | 68.62 |
| 20 | 117.009 | 2.714 | | |
| 21 | 134.391 | 7.654 | 1.58144 | 40.89 |
| 22 | −79.139 | variable | | |
| 23 | −570.068 | 5.676 | 1.54072 | 47.20 |
| 24 | −81.618 | 4.377 | | |
| 25 | 60.963 | 6.287 | 1.74330 | 49.22 |
| 26 | 481.042 | variable | | |
| 27 | −95.349 | 1.800 | 1.43700 | 95.10 |
| 28 | 33.073 | 8.783 | | |
| 29 | −70.043 | 1.600 | 1.43700 | 95.10 |
| 30 | 85.656 | 1.194 | | |
| 31 | 55.035 | 5.642 | 1.56732 | 42.84 |
| 32 | −76.211 | variable | | |
| 33 (stop) | infinity | 23.482 | | |
| 34 | −45.852 | 6.041 | 1.43700 | 95.10 |
| 35 | −27.383 | 2.773 | | |
| 36 | −25.258 | 1.800 | 1.80420 | 46.50 |
| 37 | −51.545 | 1.050 | | |
| 38 | −283.941 | 5.776 | 1.43700 | 95.10 |
| 39 | −47.115 | 1.321 | | |
| 40 | 127.283 | 8.082 | 1.43700 | 95.10 |
| 41 | −52.227 | 1.414 | | |
| 42 | −245.814 | 2.000 | 1.80610 | 40.73 |
| 43 | 47.646 | 2.649 | | |
| 44 | 54.324 | 8.631 | 1.43700 | 95.10 |
| 45 | | −78.499 variable | | |
| 46 | 76.417 | 5.993 | 1.61997 | 63.88 |
| 47 | −383.554 | 13.500 | | |
| 48 | infinity | 70.000 | 1.51680 | 64.20 |
| 49 | infinity | 4.000 | | |
| 50 | infinity | 3.000 | 1.48749 | 70.44 |
| 51 | infinity | 1.500 | | |
| image | infinity | | | |

Various Types of Data

| Zoom Ratio | | 1.46 | |
|---|---|---|---|
| | Wide | Middle | Tele |
| Fl | 13.111 | 16.115 | 19.120 |
| Fno. | 2.346 | 2.424 | 2.490 |
| ω | 41.737 | 35.876 | 31.321 |
| γ'max | 11.650 | 11.650 | 11.650 |
| TL | 429.226 | 429.199 | 429.184 |
| BF | 67.226 | 67.199 | 67.184 |
| d14 | 28.411 | 29.840 | 26.476 |
| d22 | 22.016 | 9.889 | 3.653 |
| d26 | 4.675 | 15.373 | 24.973 |
| d32 | 32.987 | 22.456 | 13.668 |
| d45 | 6.000 | 16.532 | 25.319 |

Lens Group Data

| Group (Surface) | Focal Length |
|---|---|
| 1 (1-14) | −55.137 |
| 2 (15-22) | −134.342 |
| 3 (23-26) | 61.664 |
| 4 (27-32) | −112.294 |
| 5 (33-45) | 177.224 |
| 6 (46-51) | 103.297 |

Numerical Example 3

Unit: mm

Surface Data

| i | r | d | nd | vd |
|---|---|---|---|---|
| object (SC) | infinity | 3800.000 | | |
| 1 | 107.961 | 6.500 | 1.62299 | 58.12 |
| 2 | 63.012 | 16.130 | | |
| 3 | 97.716 | 5.200 | 1.72916 | 54.67 |
| 4 | 51.627 | 23.623 | | |
| 5 | 198.650 | 4.300 | 1.59282 | 68.62 |
| 6 | 67.006 | 15.763 | | |
| 7 | 262.938 | 15.397 | 1.58144 | 40.89 |
| 8 | −99.819 | 6.300 | | |
| 9 | 192.621 | 3.900 | 1.67270 | 32.17 |
| 10 | 60.224 | 5.869 | | |
| 11 | 69.713 | 25.005 | 1.51680 | 64.20 |
| 12 | −67.218 | 0.300 | | |
| 13 | −506.317 | 3.000 | 1.72916 | 54.67 |
| 14 | 54.644 | variable | | |
| 15 | infinity | 2.500 | 1.49700 | 81.61 |
| 16 | 258.251 | 3.775 | | |
| 17 | 191.145 | 8.483 | 1.51680 | 64.20 |
| 18 | −52.042 | 1.899 | | |
| 19 | −63.124 | 2.100 | 1.80610 | 33.27 |
| 20 | 100.730 | 6.445 | | |
| 21 | −92.181 | 2.219 | 1.59282 | 68.62 |
| 22 | 126.471 | 2.627 | | |
| 23 | 142.856 | 7.402 | 1.58144 | 40.89 |
| 24 | −83.590 | variable | | |
| 25 | −651.420 | 5.728 | 1.54072 | 47.20 |
| 26 | −77.174 | 3.180 | | |
| 27 | 62.457 | 6.321 | 1.74330 | 49.22 |
| 28 | 614.290 | variable | | |
| 29 | −91.827 | 1.800 | 1.43700 | 95.10 |

-continued

Unit: mm

| | | | | |
|---|---|---|---|---|
| 30 | 33.223 | 9.085 | | |
| 31 | −69.012 | 1.601 | 1.43700 | 95.10 |
| 32 | 88.747 | 1.192 | | |
| 33 | 55.969 | 5.658 | 1.56732 | 42.84 |
| 34 | −74.304 | variable | | |
| 35 (stop) | infinity | 23.791 | | |
| 36 | −45.630 | 6.055 | 1.43700 | 95.10 |
| 37 | −27.250 | 2.755 | | |
| 38 | −25.217 | 1.800 | 1.80420 | 46.50 |
| 39 | −51.423 | 1.104 | | |
| 40 | −252.790 | 5.670 | 1.43700 | 95.10 |
| 41 | −47.734 | 1.215 | | |
| 42 | 113.932 | 8.190 | 1.43700 | 95.10 |
| 43 | −53.039 | 1.380 | | |
| 44 | −272.111 | 2.000 | 1.80610 | 40.73 |
| 45 | 46.953 | 2.642 | | |
| 46 | 53.365 | 8.693 | 1.43700 | 95.10 |
| 47 | −78.197 | variable | | |
| 48 | 81.410 | 5.907 | 1.61997 | 63.88 |
| 49 | −330.390 | 13.500 | | |
| 50 | infinity | 70.000 | 1.51680 | 64.20 |
| 51 | infinity | 4.000 | | |
| 52 | infinity | 3.000 | 1.48749 | 70.44 |
| 53 | infinity | 1.500 | | |
| image | infinity | | | |

Various Types of Data

Zoom Ratio 1.46

| | Wide | Middle | Tele |
|---|---|---|---|
| Fl | 13.113 | 16.118 | 19.123 |
| Fno. | 2.353 | 2.425 | 2.490 |
| ω | 41.715 | 35.811 | 31.251 |
| γ'max | 11.650 | 11.650 | 11.650 |
| TL | 429.225 | 429.203 | 429.186 |
| BF | 67.225 | 67.203 | 67.186 |
| d14 | 22.145 | 24.285 | 20.709 |
| d24 | 21.301 | 9.926 | 4.230 |
| d28 | 4.553 | 16.065 | 25.954 |
| d34 | 33.496 | 21.907 | 12.948 |
| d47 | 6.000 | 15.313 | 23.654 |

Lens Group Data

| Group (Surface) | Focal Length |
|---|---|
| 1 (1-14) | −55.870 |
| 2 (15-24) | −118.362 |
| 3 (25-28) | 59.560 |
| 4 (29-34) | −113.275 |
| 5 (35-47) | 169.970 |
| 6 (48-53) | 105.935 |

Numerical Example 4

Unit: mm

Surface Data

| i | r | d | nd | νd |
|---|---|---|---|---|
| object (SC) | infinity | 3800.000 | | |
| 1 | 112.890 | 6.500 | 1.62299 | 58.12 |
| 2 | 63.068 | 18.977 | | |
| 3 | 120.349 | 5.200 | 1.72916 | 54.67 |
| 4 | 59.947 | 20.429 | | |
| 5 | 209.639 | 4.300 | 1.59282 | 68.62 |
| 6 | 69.702 | 16.703 | | |
| 7 | 1517.502 | 13.003 | 1.58144 | 40.89 |
| 8 | −97.910 | 23.938 | | |

-continued

Unit: mm

| | | | | |
|---|---|---|---|---|
| 9 | 1045.425 | 14.198 | 1.51680 | 64.20 |
| 10 | −74.463 | 0.300 | | |
| 11 | −5265.796 | 3.000 | 1.72916 | 54.67 |
| 12 | 52.869 | variable | | |
| 13 | −1627.519 | 2.500 | 1.49700 | 81.61 |
| 14 | 160.916 | 2.980 | | |
| 15 | 49.859 | 11.345 | 1.51680 | 64.20 |
| 16 | −83.131 | 1.970 | | |
| 17 | −120.761 | 2.100 | 1.80610 | 33.27 |
| 18 | 46.905 | 7.943 | | |
| 19 | −143.608 | 2.200 | 1.59282 | 68.62 |
| 20 | 174.189 | 2.341 | | |
| 21 | 99.143 | 6.745 | 1.58144 | 40.89 |
| 22 | −193.655 | variable | | |
| 23 | 85687.816 | 6.749 | 1.54072 | 47.20 |
| 24 | −81.222 | 13.905 | | |
| 25 | 69.670 | 6.045 | 1.74330 | 49.22 |
| 26 | −5194.753 | variable | | |
| 27 | −84.762 | 1.800 | 1.43700 | 95.10 |
| 28 | 36.165 | 9.563 | | |
| 29 | −71.338 | 1.600 | 1.43700 | 95.10 |
| 30 | 74.847 | 1.504 | | |
| 31 | 57.510 | 5.556 | 1.56732 | 42.84 |
| 32 | −75.992 | variable | | |
| 33 (stop) | infinity | 23.945 | | |
| 34 | −51.907 | 5.167 | 1.43700 | 95.10 |
| 35 | −28.243 | 2.819 | | |
| 36 | −25.918 | 1.800 | 1.80420 | 46.50 |
| 37 | −55.299 | 1.330 | | |
| 38 | −239.255 | 5.388 | 1.43700 | 95.10 |
| 39 | −51.034 | 1.122 | | |
| 40 | 92.414 | 8.406 | 1.43700 | 95.10 |
| 41 | −54.526 | 1.201 | | |
| 42 | −483.006 | 2.000 | 1.80610 | 40.73 |
| 43 | 43.678 | 3.337 | | |
| 44 | 51.078 | 8.814 | 1.43700 | 95.10 |
| 45 | −81.064 | variable | | |
| 46 | 102.319 | 5.813 | 1.61997 | 63.88 |
| 47 | −193.965 | 13.500 | | |
| 48 | infinity | 70.000 | 1.51680 | 64.20 |
| 49 | infinity | 4.000 | | |
| 50 | infinity | 3.000 | 1.48749 | 70.44 |
| 51 | infinity | 1.500 | | |
| image | infinity | | | |

Various Types of Date

Zoom Ratio 1.46

| | Wide | Middle | Tele |
|---|---|---|---|
| Fl | 13.115 | 16.121 | 19.127 |
| Fno. | 2.355 | 2.422 | 2.490 |
| ω | 41.635 | 35.792 | 31.250 |
| γ'max | 11.650 | 11.650 | 11.650 |
| TL | 429.231 | 429.208 | 429.186 |
| BF | 67.231 | 67.208 | 67.186 |
| d12 | 18.577 | 23.293 | 19.958 |
| d22 | 24.786 | 11.372 | 5.060 |
| d26 | 4.441 | 16.088 | 25.528 |
| d32 | 23.594 | 12.373 | 4.219 |
| d45 | 6.067 | 14.339 | 22.699 |

Lens Group Data

| Group (Surface) | Focal Length |
|---|---|
| 1 (1-12) | −51.324 |
| 2 (13-22) | −139.667 |
| 3 (23-26) | 60.734 |

-continued

Unit: mm

| | |
|---|---|
| 4 (27-32) | −106.549 |
| 5 (33-45) | 160.528 |
| 6 (46-51) | 108.862 |

Table 1 shows numerical values in each of Examples.

TABLE 1

| | Lens Group | Lens | Example 1 | Example 2 | Example 3 | Example 4 |
|---|---|---|---|---|---|---|
| Transmittance of Glass Material per Thickness of 10 mm with respect to Light Having Wavelength of 440 nm | G1 | L11 | 0.995 | 0.995 | 0.995 | 0.995 |
| | | L12 | 0.995 | 0.995 | 0.995 | 0.995 |
| | | L13 | 0.991 | 0.991 | 0.991 | 0.991 |
| | | L14 | 0.989 | 0.989 | 0.989 | 0.989 |
| | | L15 | 0.975 | 0.975 | 0.975 | 0.998 |
| | | L16 | 0.998 | 0.998 | 0.998 | 0.995 |
| | | L17 | 0.995 | 0.995 | 0.995 | — |
| | G2 | L21 | 0.998 | 0.998 | 0.997 | 0.997 |
| | | L22 | 0.978 | 0.978 | 0.998 | 0.998 |
| | | L23 | 0.991 | 0.991 | 0.978 | 0.978 |
| | | L24 | 0.989 | 0.989 | 0.991 | 0.991 |
| | | L25 | — | — | 0.989 | 0.989 |
| Refractive Index of Lens with respect to d-line | G1 | L11 | 1.62299 | 1.62299 | 1.62299 | 1.62299 |
| | | L12 | 1.72916 | 1.72916 | 1.72916 | 1.72916 |
| | | L13 | 1.59282 | 1.59282 | 1.59282 | 1.59282 |
| | | L14 | 1.58144 | 1.58144 | 1.58144 | 1.58144 |
| | | L15 | 1.67270 | 1.67270 | 1.67270 | 1.51680 |
| | | L16 | 1.51680 | 1.51680 | 1.51680 | 1.72916 |
| | | L17 | 1.72916 | 1.72916 | 1.72916 | — |
| | G2 | L21 | 1.51680 | 1.51680 | 1.49700 | 1.49700 |
| | | L22 | 1.80610 | 1.80610 | 1.51680 | 1.51680 |
| | | L23 | 1.59282 | 1.59282 | 1.80610 | 1.80610 |
| | | L24 | 1.58144 | 1.58144 | 1.59282 | 1.59282 |
| | | L25 | — | — | 1.58144 | 1.58144 |

<Projection Apparatus>

Figure 9:
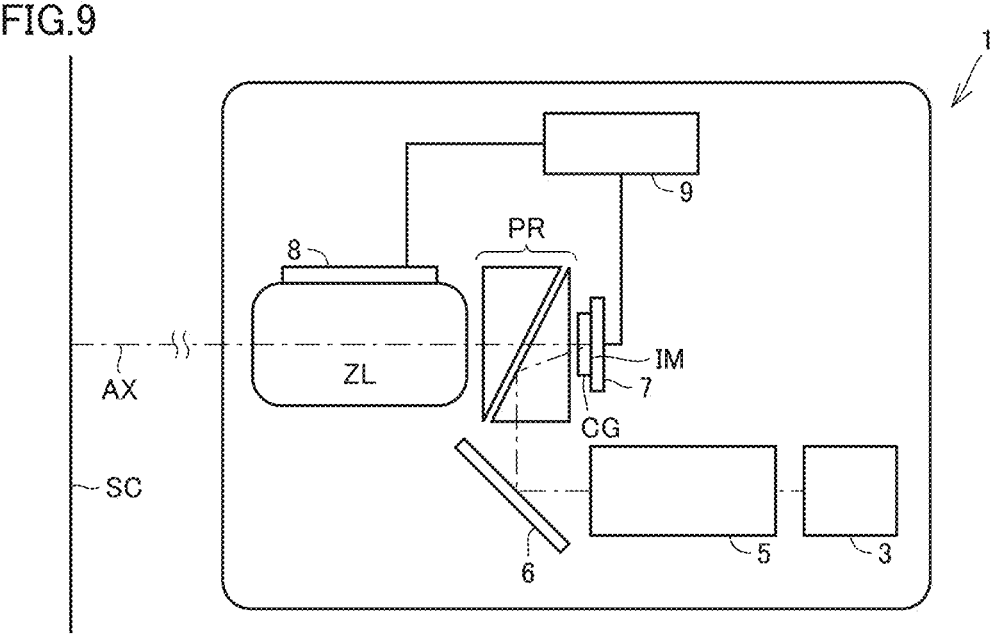
FIG. 9 is a schematic diagram showing a projection apparatus according to an embodiment.

A projection apparatus 1 according to an embodiment will be described with reference to FIG. 9. As shown in FIG. 9, projection apparatus 1 includes a light source 3, an illumination optical system 5, a reflecting mirror 6, a prism PR, a cover glass CG, an image display element 7, a variable magnification projection optical system ZL, an actuator 8, and a controller 9. Variable magnification projection optical system ZL is any one of variable magnification projection optical systems ZL according to the first to fourth embodiments.

Light source 3 is, for example, a white light source such as a xenon lamp, or a laser light source. Image display element 7 is, for example, a digital micromirror device (DMD), a liquid crystal display device (LCD), or the like. Cover glass CG is provided on image display surface IM of image display element 7. Actuator 8 may move a movable lens group for zooming or focusing along optical axis AX of variable magnification projection optical system ZL. Controller 9 controls projection apparatus 1. Controller 9 controls image display element 7 and actuator 8, for example. Controller 9 controls the actuator to move the movable lens group for zooming or focusing.

Light source 3 emits illumination light which in turn passes through illumination optical system 5, reflecting mirror 6, and prism PR and is thus incident on image display element 7. Image display element 7 modulates the illumination light and reflects image light. Prism PR includes, for example, a TIR prism, a color separation/combination prism, or the like. Variable magnification projection optical system ZL enlarges the image light formed by image display element 7 and projects it toward a screen surface SC. The distance between variable magnification projection optical system ZL and screen surface SC on optical axis AX of variable magnification projection optical system ZL is 1 m or more and 3 m or less, for example.

Note that the movable lens group may be manually moved without using actuator 8. When image display element 7 is a self-luminous image display element, light source 3, illumination optical system 5, and reflecting mirror 6 may not be provided.

Although embodiments of the present invention have been described and illustrated in detail, the disclosed embodiments are made for purposes of illustration and example only and not limitation. The scope of the present invention should be interpreted by terms of the appended claims.

What is claimed is:

1. A variable magnification projection optical system that enlarges and projects an image displayed on an image display surface, the variable magnification projection optical system comprising, in order from an enlargement side:
    a first lens group having negative refractive power,
    a second lens group having negative refractive power; and
    a third lens group having positive refractive power, wherein
    during zooming, the first lens group is fixed, and the second lens group and the third lens group move,
    the second lens group includes a plurality of lenses each having positive refractive power, and
    all lenses each having positive refractive power in the first lens group and the second lens group are made of a glass material having a transmittance greater than 0.98 per thickness of 10 mm with respect to light having a wavelength of 440 nm;
    wherein all lenses in the first lens group are made of a glass material having a transmittance greater than 0.97 per thickness of 10 mm with respect to light having a wavelength of 440 nm.

2. The variable magnification projection optical system according to claim 1, wherein all lenses in the first lens group and the second lens group are made of a glass material having a transmittance greater than 0.97 per thickness of 10 mm with respect to light having a wavelength of 440 nm.

3. The variable magnification projection optical system according to claim 1, wherein the first lens group includes seven or less lenses each having refractive power.

4. The variable magnification projection optical system according to claim 1, wherein the second lens group includes four or more lenses each having refractive power.

5. The variable magnification projection optical system according to claim 1, further comprising at least one lens group that is disposed on a reduction side of the third lens group and that moves along an optical axis of the variable magnification projection optical system during zooming.

6. The variable magnification projection optical system according to claim 1, wherein no asphere is included in the first lens group.

7. The variable magnification projection optical system according to claim 1, wherein no asphere is included in the variable magnification projection optical system.

8. A projection apparatus comprising:
the variable magnification projection optical system according to claim 1; and
an image display element having the image display surface.

9. A variable magnification projection optical system that enlarges and projects an image displayed on an image display surface, the variable magnification projection optical system comprising, in order from an enlargement side:
a first lens group having negative refractive power,
a second lens group having negative refractive power; and
a third lens group having positive refractive power, wherein
during zooming, the first lens group is fixed, and the second lens group and the third lens group move,
the second lens group includes a plurality of lenses each having positive refractive power, and
a refractive index of each of all lenses that has positive refractive power in the first lens group and the second lens group with respect to a d-line is smaller than 1.6.

10. The variable magnification projection optical system according to claim 9, wherein a refractive index of each of all lenses in the first lens group with respect to the d-line is smaller than 1.75.

11. The variable magnification projection optical system according to claim 9, wherein the first lens group includes seven or less lenses each having refractive power.

12. The variable magnification projection optical system according to claim 9, wherein the second lens group includes four or more lenses each having refractive power.

13. The variable magnification projection optical system according to claim 9, further comprising at least one lens group that is disposed on a reduction side of the third lens group and that moves along an optical axis of the variable magnification projection optical system during zooming.

14. The variable magnification projection optical system according to claim 9, wherein no asphere is included in the first lens group.

15. The variable magnification projection optical system according to claim 9, wherein no asphere is included in the variable magnification projection optical system.

16. A projection apparatus comprising:
the variable magnification projection optical system according to claim 9; and
an image display element having the image display surface.

* * * * *